United States Patent
Mathison (10) Patent No.: US 11,313,514 B2
(45) Date of Patent: Apr. 26, 2022

(54) METHOD AND SYSTEM FOR TANK REFUELING USING DISPENSER AND NOZZLE READINGS

(71) Applicant: Honda Motor Co., Ltd., Tokyo (JP)

(72) Inventor: Steven R. Mathison, Rancho Palos Verdes, CA (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 16/530,415

(22) Filed: Aug. 2, 2019

(65) Prior Publication Data
US 2020/0173607 A1 Jun. 4, 2020

Related U.S. Application Data

(60) Provisional application No. 62/774,959, filed on Dec. 4, 2018.

(51) Int. Cl.
*F17C 5/00* (2006.01)
*F17C 13/02* (2006.01)

(52) U.S. Cl.
CPC ............ *F17C 5/007* (2013.01); *F17C 13/026* (2013.01); *F17C 2221/012* (2013.01); *F17C 2227/0157* (2013.01); *F17C 2250/032* (2013.01); *F17C 2250/0439* (2013.01); *F17C 2250/0673* (2013.01); *F17C 2270/0168* (2013.01)

(58) Field of Classification Search
CPC .................. F17C 5/007; F17C 13/026; F17C 2250/0673; F17C 2270/0168; F17C 2221/012; F17C 2227/0157; F17C 2250/032; F17C 2250/0439; F17C 2250/034; F17C 2201/056; F17C 2201/058; F17C 2205/013; F17C 2223/0123; F17C 2223/036; F17C 2225/0123; F17C 2225/036; F17C 2227/04; F17C 2250/043; F17C 2250/0443; F17C 2265/065; F17C 2260/025; F17C 2260/022;
(Continued)

(56) References Cited

U.S. PATENT DOCUMENTS 3,536,109 A    10/1970 Ginsburgh et al.
4,347,472 A    8/1982 Lemelson
(Continued)

FOREIGN PATENT DOCUMENTS

CN    101087975 A    12/2007
CN    101488576 A    7/2009
(Continued)

*Primary Examiner* — Timothy P. Kelly
*Assistant Examiner* — Stephanie A Shrieves
(74) *Attorney, Agent, or Firm* — Stinson LLP (57) ABSTRACT

A plurality of sensors detect a plurality of fuel temperatures at a filling station, and a controller communicates with the sensors to identify the fuel temperatures, uses the fuel temperatures to determine a plurality of candidate fill times, and compares the candidate fill times to identify a control value for controlling a delivery of fuel. The fuel temperatures include a first fuel temperature corresponding to a first location at the filling station and a second fuel temperature corresponding to a second location at the filling station, and the candidate fill times include a first candidate fill time corresponding to the first fuel temperature and a second candidate fill time corresponding to the second fuel temperature.

14 Claims, 5 Drawing Sheets

(58) Field of Classification Search
CPC ........ F17C 2260/023; F17C 2227/0341; F17C 227/0393; F17C 2260/026; F17C 5/06; Y02E 60/32
USPC .......................................................... 141/10
See application file for complete search history.

(56) References Cited

U.S. PATENT DOCUMENTS

| | | | |
|---|---|---|---|
| 4,398,172 A | 8/1983 | Carroll et al. |
| 4,490,798 A | 12/1984 | Franks et al. |
| 4,527,600 A | 7/1985 | Fisher et al. |
| 4,934,419 A | 6/1990 | Lamont et al. |
| 5,058,044 A | 10/1991 | Stewart et al. |
| 5,201,819 A | 4/1993 | Ryan |
| 5,202,617 A | 4/1993 | Nor |
| 5,238,030 A | 8/1993 | Miller et al. |
| 5,259,424 A | 11/1993 | Miller et al. |
| 5,327,066 A | 7/1994 | Smith |
| 5,359,522 A | 10/1994 | Ryan |
| 5,479,966 A | 1/1996 | Tison et al. |
| 5,564,306 A | 10/1996 | Miller |
| 5,569,922 A | 10/1996 | Clarke |
| 5,570,729 A | 11/1996 | Mutter |
| 5,594,318 A | 1/1997 | Nor et al. |
| 5,602,745 A | 2/1997 | Atchley et al. |
| 5,628,349 A | 5/1997 | Diggins et al. |
| 5,750,995 A | 5/1998 | Clarke |
| 5,762,118 A | 6/1998 | Epworth et al. |
| 5,868,176 A | 2/1999 | Barakas et al. |
| 5,868,479 A | 2/1999 | Hoffman |
| 5,881,779 A | 3/1999 | Kountz et al. |
| 5,956,259 A | 9/1999 | Hartsell, Jr. et al. |
| 5,970,786 A | 10/1999 | Smith et al. |
| 5,971,042 A | 10/1999 | Hartsell, Jr. |
| 6,024,137 A | 2/2000 | Strnad et al. |
| 6,068,030 A | 5/2000 | Tatsuno |
| 6,070,156 A | 5/2000 | Hartsell, Jr. |
| 6,073,081 A | 6/2000 | Hettinger et al. |
| 6,089,284 A | 7/2000 | Kaehler et al. |
| 6,185,501 B1 | 2/2001 | Smith et al. |
| 6,237,647 B1 | 5/2001 | Pong et al. |
| 6,250,347 B1 | 6/2001 | Tatsuno |
| 6,338,008 B1 | 1/2002 | Kohut et al. |
| 6,343,241 B1 | 1/2002 | Kohut et al. |
| 6,381,514 B1 | 4/2002 | Hartsell, Jr. |
| 6,382,269 B1 | 5/2002 | Tatsuno |
| 6,394,150 B1 | 5/2002 | Haimovich et al. |
| 6,401,767 B1 | 6/2002 | Cohen et al. |
| 6,463,967 B1 | 10/2002 | Boyle |
| 6,497,363 B1 | 12/2002 | Kelrich |
| 6,598,792 B1 | 7/2003 | Michot et al. |
| 6,619,336 B2 | 9/2003 | Cohen et al. |
| 6,672,340 B2 * | 1/2004 | Mutter .............. F17C 5/06 141/4 |
| 6,688,342 B2 | 2/2004 | Lewis |
| 6,708,573 B1 | 3/2004 | Cohen et al. |
| 6,727,809 B1 | 4/2004 | Smith |
| 6,745,801 B1 | 6/2004 | Cohen et al. |
| 6,822,551 B2 | 11/2004 | Li et al. |
| 6,964,821 B2 | 11/2005 | Hirakata |
| 7,059,364 B2 | 6/2006 | Kountz et al. |
| 7,171,989 B2 | 2/2007 | Corless et al. |
| 7,406,987 B2 | 8/2008 | Takano et al. |
| 7,412,994 B2 | 8/2008 | Corless et al. |
| 7,523,770 B2 | 4/2009 | Horowitz et al. |
| 7,543,611 B2 | 6/2009 | Kallberg |
| 7,647,194 B1 | 1/2010 | Casey et al. |
| 7,671,482 B2 | 3/2010 | Tighe |
| 7,820,313 B2 | 10/2010 | Winkler |
| 7,921,883 B2 | 4/2011 | Cohen et al. |
| 8,360,112 B2 | 1/2013 | Allidieres et al. |
| 8,517,062 B2 | 8/2013 | Allidieres et al. |
| 8,783,303 B2 | 7/2014 | Harty et al. |
| 9,347,614 B2 | 5/2016 | Mathison |
| 2005/0178463 A1 | 8/2005 | Kountz et al. |
| 2007/0090693 A1 | 4/2007 | Stabler |
| 2008/0000542 A1 | 1/2008 | Cohen et al. |
| 2008/0185068 A1 | 8/2008 | Cohen et al. |
| 2008/0231836 A1 | 9/2008 | Curello et al. |
| 2008/0289720 A1 | 11/2008 | Takano et al. |
| 2009/0044877 A1 | 2/2009 | Faudou et al. |
| 2009/0107577 A1 * | 4/2009 | Allidieres ................. F17C 7/00 141/1 |
| 2009/0205745 A1 | 8/2009 | Farese et al. |
| 2010/0121551 A1 | 5/2010 | Boss et al. |
| 2010/0185360 A1 | 7/2010 | Windbergs et al. |
| 2010/0241470 A1 | 9/2010 | Smith |
| 2010/0294393 A1 | 11/2010 | Allidieres et al. |
| 2010/0307636 A1 * | 12/2010 | Uemura .................... F17C 5/06 141/4 |
| 2011/0035049 A1 | 2/2011 | Barrett |
| 2011/0100507 A1 | 5/2011 | Weitzhandler et al. |
| 2011/0259469 A1 * | 10/2011 | Harty .................... F17C 13/025 141/4 |
| 2012/0192989 A1 | 8/2012 | Schulze |
| 2012/0227864 A1 * | 9/2012 | Mori ......................... F17C 5/06 141/95 |
| 2012/0267002 A1 * | 10/2012 | Kittilsen .................. F17C 5/06 141/4 |
| 2013/0014854 A1 * | 1/2013 | Mori ...................... B67D 7/348 141/1 |
| 2014/0290790 A1 * | 10/2014 | Mathison ................. F17C 5/007 141/4 |
| 2015/0308621 A1 * | 10/2015 | Mathison ................. F17C 5/007 141/4 |
| 2016/0305611 A1 * | 10/2016 | Handa ................... F17C 13/023 |
| 2018/0038550 A1 * | 2/2018 | Kondo ..................... F17C 5/06 |

FOREIGN PATENT DOCUMENTS

| | | |
|---|---|---|
| DE | 19643801 A1 | 5/1998 |
| EP | 0653585 A1 | 5/1995 |
| EP | 1205704 A1 | 5/2002 |
| EP | 1831597 A2 | 9/2007 |
| EP | 2093475 A1 | 8/2009 |
| WO | 2005120196 A3 | 12/2005 |
| WO | 2007077376 A3 | 7/2007 |

* cited by examiner

METHOD AND SYSTEM FOR TANK REFUELING USING DISPENSER AND NOZZLE READINGS

CROSS-REFERENCE TO RELATED DISCLOSURE

This disclosure claims the benefit of U.S. Provisional Patent Application No. 62/774,959, filed Dec. 4, 2018, which is incorporated by reference herein in its entirety.

BACKGROUND

Conventional hydrogen tank refueling procedures tend to be conservative, often conceding performance and/or efficiency. For example, the Society of Automotive Engineers (SAE) J2601 standard entitled "Fueling Protocols for Light Duty Gaseous Hydrogen Surface Vehicles," the disclosure of which is incorporated herein by reference in its entirety, incorporates several conservative assumptions to account for a broad range of possible tank configurations and refueling conditions. This concession may be noticeable with non-communication fueling operations in which the parametric assumptions are even more conservative because the hydrogen station does not have information about the tank that it is filling. While current fueling protocols are structured to reduce the likelihood of overheating and/or overfilling, the wide margins inherent in these protocols can result in longer fill times and/or excessive energy usage.

SUMMARY

Examples of the disclosure enable tank refueling using dispenser and nozzle readings. In one aspect, a method is provided for filling a fuel tank. The method includes identifying a plurality of fuel temperatures including a first fuel temperature corresponding to a first location at a filling station and a second fuel temperature corresponding to a second location at the filling station, determining a plurality of candidate fill times based on the fuel temperatures, and selecting a control value from the candidate fill times for controlling a delivery of fuel to the fuel tank. The candidate fill times include a first candidate fill time determined using the first fuel temperature and a second candidate fill time determined using the second fuel temperature.

In another aspect, a filling station is provided. The filling station includes a fuel source, a fuel dispenser coupled in fluid communication with the fuel source, a first sensor at the fuel dispenser, a nozzle coupled in fluid communication with the fuel dispenser, a second sensor at the nozzle, and a controller. The nozzle is coupleable to a vehicle for filling a fuel tank at the vehicle. The first sensor is configured to detect a first parameter associated with the fuel dispenser, and the second sensor is configured to detect a second parameter associated with the nozzle. The controller determines a plurality of candidate fill times based on the first parameter and the second parameter and compares the candidate fill times to identify a control value for controlling a delivery of fuel to the fuel tank.

In yet another aspect, a control system is provided for controlling a filling station. The control system includes a plurality of sensors detecting a plurality of fuel temperatures at the filling station, and a controller communicating with the sensors to identify the fuel temperatures, using the fuel temperatures to determine a plurality of candidate fill times, and comparing the candidate fill times to identify a control value for controlling a delivery of fuel. The fuel temperatures include a first fuel temperature corresponding to a first location at the filling station and a second fuel temperature corresponding to a second location at the filling station, and the candidate fill times include a first candidate fill time corresponding to the first fuel temperature and a second candidate fill time corresponding to the second fuel temperature.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Examples described below will be more clearly understood when the detailed description is considered in conjunction with the accompanying drawings, in which.

It should be noted that these drawings are intended to illustrate the general characteristics of methods, structure and/or materials utilized in the examples and to supplement the written description provided below. These drawings are not, however, to scale and may not precisely reflect the precise structural or performance characteristics of any given example, and should not be interpreted as defining or limiting the range of values or properties encompassed by the examples.

Corresponding reference characters indicate corresponding parts throughout the drawings. Although specific features may be shown in some of the drawings and not in others, this is for convenience only. In accordance with the examples described herein, any feature of a drawing may be referenced and/or claimed in combination with any feature of any other drawing.

DETAILED DESCRIPTION

The present disclosure relates to filling stations and, more particularly, to methods and systems for filling one or more fuel tanks using dispenser and nozzle readings. As described in commonly-owned U.S. Pat. No. 9,347,614 entitled "Method and System for Tank Refilling Using Active Fueling Speed Control," which issued on May 24, 2016 from U.S. application Ser. No. 14/300,229 filed Jun. 9, 2014 and is incorporated by reference herein in its entirety, a hydrogen filling station may utilize an analytical method to calculate an end-of-fill temperature in a hydrogen tank that, in turn, allows for improvements in a fill quantity while tending to reduce refueling time. However, the amount of heat transferred from the fueling hardware to the hydrogen gas throughout the fill may have a significant effect on the gas temperature development inside a fuel tank of a vehicle. The present disclosure more accurately takes advantage of down-the-line readings to account for this heat transfer, reducing fill times and/or using warmer pre-cooling temperatures. Examples described herein calculate fill times based on fuel delivery temperatures. Other benefits and advantages will become clear from the disclosure provided herein and those advantages provided are for illustration.

Figure 1:
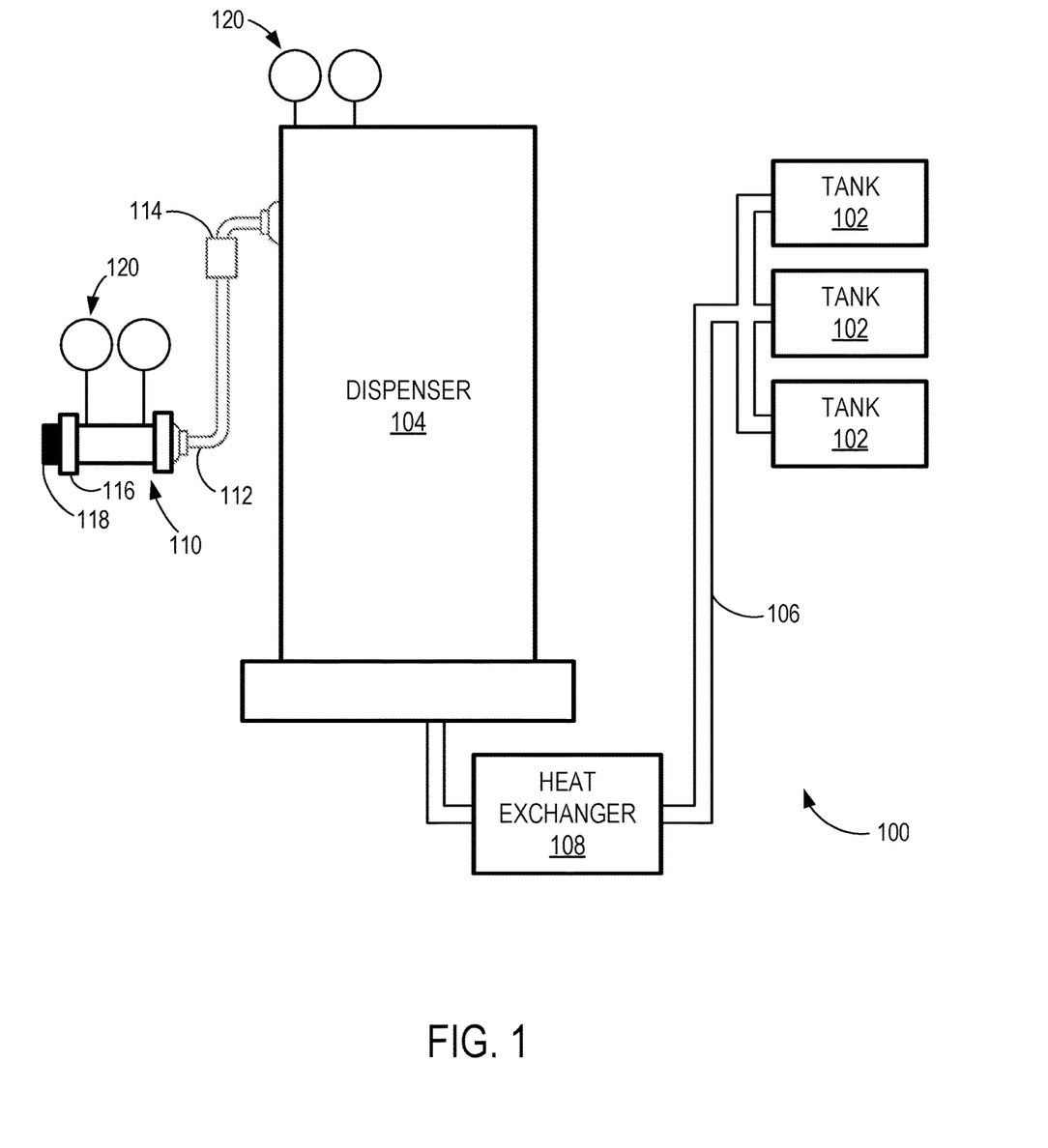
FIG. 1 is a schematic diagram of an example hydrogen station in accordance with one aspect of the present disclosure.

Turning to FIG. 1, a schematic diagram of an example hydrogen station 100 in accordance with one aspect of the present disclosure is provided. The hydrogen station 100 may include a fuel source having a plurality of tanks 102 for storing hydrogen (e.g., high-pressure hydrogen gas). The tanks 102 may be filled, for example, using hydrogen transported via trucks and/or pipes. Additionally or alternatively, hydrogen may be generated on site (e.g., by separating hydrogen from water or natural gas). While three tanks 102 are shown, the fuel source may include any number of tanks 102.

The tanks 102 may be coupled in fluid communication with a dispenser 104 via one or more pipes 106. In some examples, a heat exchanger 108 may be coupled to the pipes 106 for controlling a temperature of the hydrogen gas before or as it is channeled to the dispenser 104. For example, the heat exchanger 108 may cool the hydrogen gas to −40 degrees Celsius (° C.). The dispenser 104 may be coupled in fluid communication with a nozzle 110 via a hydrogen supply tube or hose 112. The hose 112 may include a breakaway 114 that allows the hose 112 to separate into multiple segments. In some examples, the dispenser 104 includes a nozzle holder (not shown) for holding the nozzle 110 detachably thereon. The nozzle holder may hold the nozzle 110, for example, when the fueling process is not being performed. In some examples, the hydrogen station 100 includes a compressor in direct communication with the dispenser 104 and/or heat exchanger 108.

The nozzle 110 may be coupleable to a vehicle (not shown) for filling a fuel tank (e.g., at the vehicle). As shown in FIG. 1, the nozzle 110 may include a filling coupler 116 that enables the nozzle 110 to be detachably coupled to a hydrogen charging port of the vehicle. In some examples, the nozzle 110 may include a connection sensor 118 that detects whether the nozzle 110 is held on the nozzle holder and/or coupled to the hydrogen charging port. In some examples, the dispenser 104 automatically starts charging hydrogen when the filling coupler 116 is coupled to a hydrogen charging port. During fueling, hydrogen gas is channeled from the tanks 102 and through the pipes 106 and hose 112. A plurality of sensors 120 may detect or measure a plurality of thermodynamic parameters at the hydrogen station 100. For example, the sensors 120 may be configured to detect or measure a temperature, pressure, and/or flow rate of hydrogen gas channeled through the pipes 106 and/or hose 112. The dispenser 104 and/or nozzle 110 may be equipped with a flow regulating valve, an open-close valve, and the like.

Figure 2:
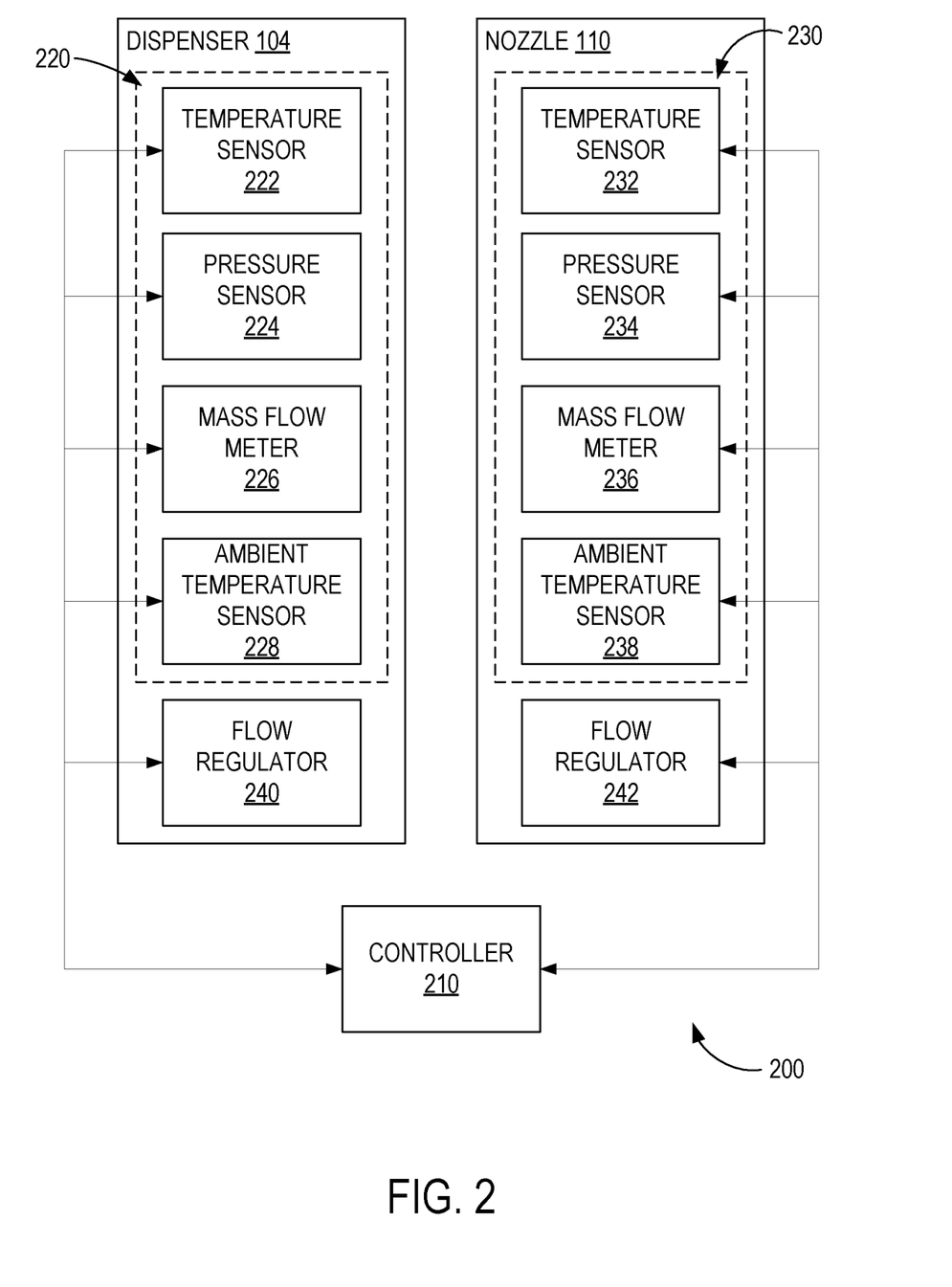
FIG. 2 is a block diagram of an example control system that may be used to control one or more operations at a filling station, such as the hydrogen station shown in FIG. 1, in accordance with one aspect of the present disclosure.

FIG. 2 shows an example control system 200 for managing one or more operations at the hydrogen station 100. The control system 200 includes a controller 210 that communicates with the sensors 120 to control a delivery of hydrogen gas based on one or more thermodynamic parameters.

As shown in FIG. 2, the controller 210 may be communicatively coupled to one or more first sensors 220 associated with a first location at the hydrogen station 100 (e.g., the dispenser 104). The first sensors 220 may include a first temperature sensor 222, a first pressure sensor 224, a first mass flow meter 226, and/or a first ambient temperature sensor 228. The first sensors 220 may be disposed at a location that would allow thermodynamic parameters to be identified before or as the hydrogen gas is leaving the dispenser 104. In some examples, the first sensors 220 are at or upstream of the breakaway 114 (e.g., at a fitting between the dispenser 104 and the hose 112) or inside the dispenser 104.

The controller 210 may also be communicatively coupled to one or more second sensors 230 associated with a second location at the hydrogen station 100 (e.g., the nozzle 110). The second sensors 230 may include a second temperature sensor 232, a second pressure sensor 234, a second mass flow meter 236, and a second ambient temperature sensor 238. The second sensors 230 may be disposed at a location that would allow thermodynamic parameters to be identified after the hydrogen gas has left the dispenser 104. In some examples, the second sensors 230 are at or downstream of the breakaway 114 (e.g., at a fitting between the nozzle 110 and the hose 112) or inside the nozzle 110.

The controller 210 may communicate with, and continuously receives measurement values as inputs from, the first sensors 220 and second sensors 230 to identify thermodynamic parameters in the manner described below. The controller 210 may include one or more arithmetic processors, computers, or any other devices capable of receiving all of the herein-described measurement values, performing all of the herein-described calculations, and controlling the dispenser 104 and/or nozzle 110 to dispense hydrogen at a calculated temperature, pressure, and/or flow rate. To this end, the control system 200 may include a first flow regulator 240 (e.g., flow regulating valve, open-close valve) at the first location and/or a second flow regulator 242 (e.g., flow regulating valve, open-close valve) at the second location, in addition to the heat exchanger 108 (shown in FIG. 1), the breakaway 114, and the connection sensor 118 (shown in FIG. 1).

Figure 3:
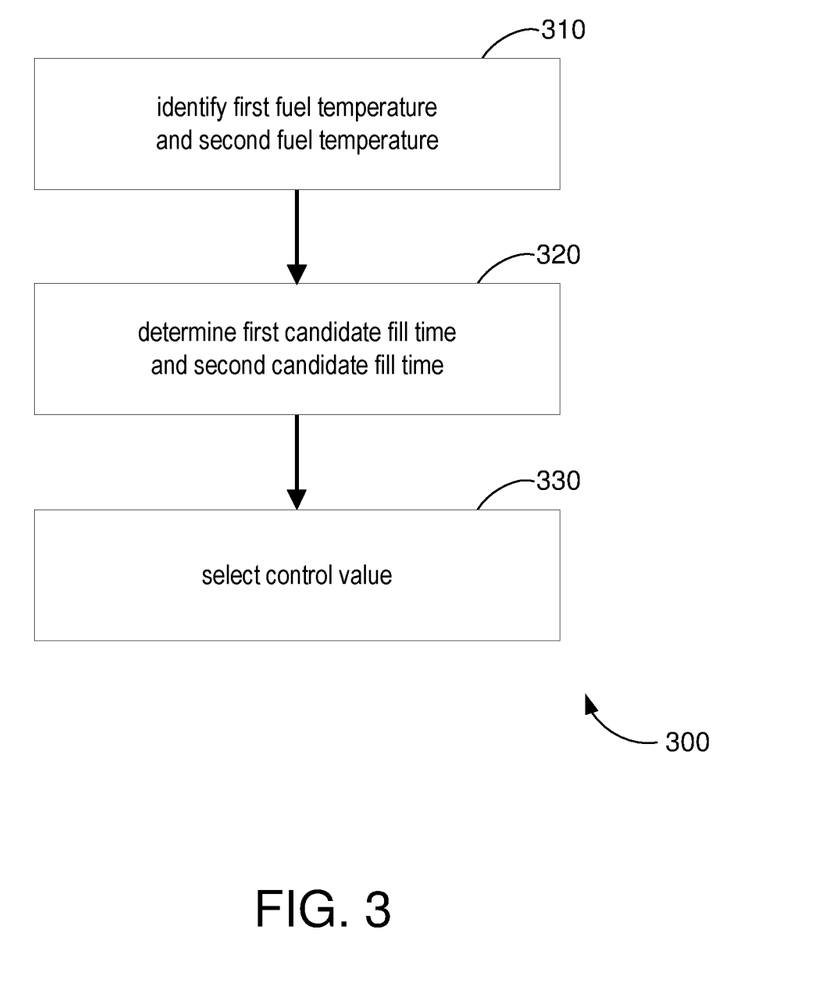
FIG. 3 is a flowchart of an example method for filling a fuel tank in accordance with one aspect of the present disclosure.

FIG. 3 shows an example method 300 for filling a fuel tank at a vehicle. The controller 210 may be used to implement one or more operations of the method 300. For example, a first fuel temperature and a second fuel temperature are identified at operation 310. Each fuel temperature is associated with a respective location at the hydrogen station 100. The fuel temperatures may be identified based on measurement values received from one or more sensors 120 (e.g., first temperature sensor 222, second temperature sensor 232). In this manner, a first fuel temperature corresponding to a first reading or measurement value received from the first temperature sensor 222 may be associated with the dispenser 104, and/or a second fuel temperature corresponding to a second reading or measurement value received from the second temperature sensor 232 may be associated with the nozzle 110. While a vehicle may be at the hydrogen station 100 during fueling, the fuel temperatures identified at operation 310 are specifically associated with the hydrogen station 100 and components of the hydrogen station 100 (e.g., tank 102, dispenser 104, heat exchanger 108, nozzle 110).

A first candidate fill time and a second candidate fill time may be determined at operation 320. The candidate fill times may be determined based on the identified fuel temperatures. For example, the first candidate fill time may be determined using the first fuel temperature, and the second candidate fill time may be determined using the second fuel temperature. A control value is selected at operation 330 for controlling a delivery of fuel to the fuel tank is selected. The lower of the candidate fill times, for example, may be identified as the control value. The fuel temperatures, candidate fill times, and/or control values are monitored over time to determine when to change the control value. For example, the fuel temperatures, candidate fill times, and/or control values may be identified iteratively at a plurality of times.

Figure 4:
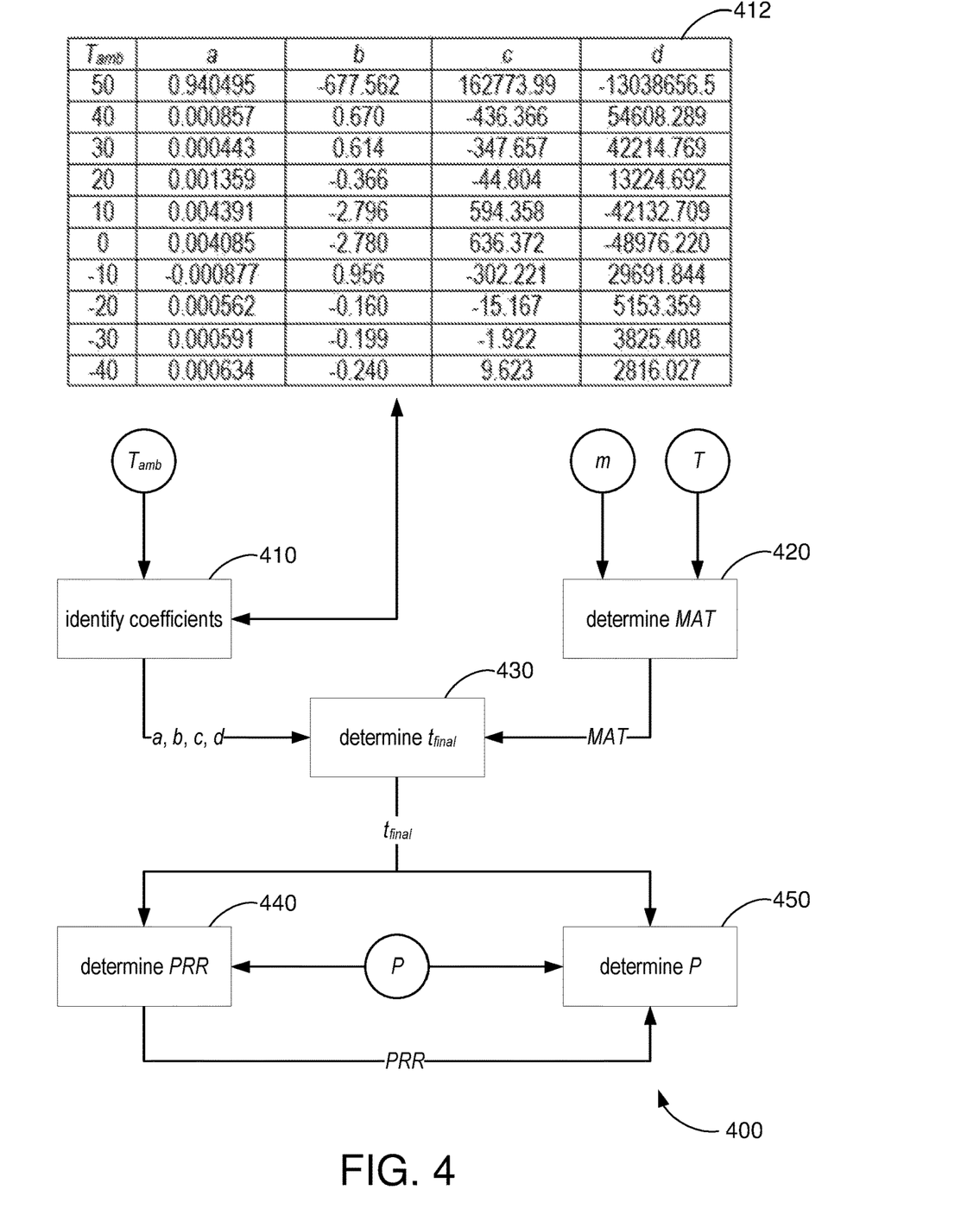
FIG. 4 is a flow diagram of an example method for determining a time to fill a fuel tank at a filling station, such as the hydrogen station shown in FIG. 1, in accordance with one aspect of the present disclosure.

FIG. 4 shows an example method 400 for calculating a time to fill a fuel tank ($t_{final}$). The value for $t_{final}$ may be used, for example, to manage one or more operations at a hydrogen station 100, such as pressure and/or temperature regulation of the hydrogen gas being dispensed.

One or more coefficients (a, b, c, d) are identified at operation 410. As shown in FIG. 4, a table 412 may be used to identify values for a, b, c, and d based on an ambient temperature ($T_{amb}$). In some examples, a value for $T_{amb}$ is detected by and/or received from the first ambient temperature sensor 228 and/or second ambient temperature sensor 238. Because ambient temperatures may vary based on time, each set of coefficients may be identified continuously or iteratively (e.g., at a plurality of times) throughout the fill.

The table 412 may be the same or similar to that used in the original MC Formula described in commonly-owned U.S. Pat. No. 9,347,614 entitled "Method and System for Tank Refilling Using Active Fueling Speed Control," which issued on May 24, 2016 from U.S. Application Ser. No. 14/300,229 filed Jun. 9, 2014 and is incorporated by reference herein in its entirety. Values for a, b, c, and d may also be derived from fueling simulations using the same or similar fueling model with the same or similar assumptions and boundary conditions used in the original MC Formula. To account for differences between locations, a first set of coefficients (e.g., $a_D$, $b_D$, $c_D$, $d_D$) may be identified based on a first location at the hydrogen station 100 (e.g., the dispenser 104), and a second set of coefficients (e.g., $a_N$, $b_N$, $c_N$, $d_N$) may be identified based on a second location at the hydrogen station 100 (e.g., the nozzle 110).

A mass average temperature of the hydrogen gas (MAT) may be identified at operation 420. A value for MAT may be identified based on a mass flow rate of the hydrogen gas ($\dot{m}$) and a temperature of the hydrogen gas (T). For example, a value for MAT for a time interval (i) may be calculated using Equation [1]:

$$MAT_{(i)} = \frac{\sum_1^i [\Delta m_{(i)} \times 0.5(T_{(i)} + T_{(i-1)})]}{\sum_1^i \Delta m_{(i)}} \quad [1]$$

where $\Delta m_{(i)}$ is a change in mass of the hydrogen gas relative to the previous measurement (i.e., $m_{(i)} - m_{(i-1)}$);

$T_{(i)}$ is a temperature of the hydrogen gas according to the current measurement; and $T_{(i-1)}$ is a temperature of the hydrogen gas according to the previous measurement.

Because flow rates and/or temperatures of the hydrogen gas may vary based on location, a first mass average temperature (e.g., $MAT_D$) may be identified based on a first change in mass and temperature associated with the first location at the hydrogen station 100 (e.g., $\Delta m_D$ and $T_D$, respectively), and second mass average temperature (e.g., $MAT_N$) may be identified based on a second change in mass and temperature associated with the second location at the hydrogen station 100 (e.g., $\Delta m_N$ and $T_N$, respectively). Values for $\Delta m_D$, $T_D$, $\Delta m_N$, and $T_N$ may be detected by and/or received from the first mass flow meter 226, first temperature sensor 222, second mass flow meter 236, and second temperature sensor 232, respectively. Additionally, because flow rates and/or temperatures of the hydrogen gas may vary based on time, each MAT may be identified continuously or iteratively (e.g., at a plurality of times) throughout the fill. In some examples, values for $MAT_D$ and $MAT_N$ are identified or calculated using a common value for $\Delta m$ detected by and/or received from a single mass flow meter (e.g., first mass flow meter 226 or second mass flow meter 236).

For each time interval, a control value for $t_{final}$ is identified at operation 430 using the coefficients identified at operation 410 (e.g., a, b, c, d) and the mass average temperature identified at operation 420 (e.g., MAT). A value for $t_{final}$ may be calculated, for example, using Equation [2]:

$$t_{final} = \alpha \times \beta \times [a \times MAT^3 + b \times MAT^2 + c \times MAT + d] \quad [2]$$

where

α is an adjustment factor to account for variability in a pressure ramp rate (PRR) during fueling; and β is an adjustment factor to account for a pressure corridor which defines an upper pressure limit above the ramp pressure and a lower pressure limit below the ramp pressure during the fill.

A value for beta (β) may be calculated using Equation [3]:

$$\beta = \frac{(P_{final} - P_{min})}{(P_{final} - P_{min} - P_{tol})} \quad [3]$$

where $P_{final}$ is a predetermined target fill pressure of the hydrogen gas;

$P_{min}$ is a predetermined minimum fill pressure of the hydrogen gas; and $P_{tol}$ is a predetermined fill pressure tolerance.

Monitoring thermodynamic parameters throughout the fill ensures an efficient and effective fueling process. From a control standpoint, differences between thermodynamic parameters may lead to varying values for $t_{final}$. For example, a first fill time (e.g., $t_{final_D}$) determined based on the first set of coefficients (e.g., $a_D$, $b_D$, $c_D$, $d_D$) and first mass average temperature (e.g., $MAT_D$) may be different from a second fill time (e.g., $t_{final_N}$) determined based on the second set of coefficients (e.g., $a_N$, $b_N$, $c_N$, $d_N$) and second mass average temperature (e.g., $MAT_N$). To take advantage of any differences between thermodynamic parameters at the first location at the hydrogen station 100 and thermodynamic parameters at the second location at the hydrogen station 100, both $t_{final_D}$ and $t_{final_N}$ are calculated, and the lower of the two $t_{final}$ values is identified as the control value. Accordingly, a control value for $t_{final}$ may be selected from a first candidate fill time ($t_{final_D}$) and a second candidate fill time ($t_{final_N}$) using Equation [4]:

$$t_{final_D} = \alpha \times \beta \times [a_D \times MAT_D^3 + b_D \times MAT_D^2 + c_D \times MAT_D + d_D];$$

$$t_{final_N} = \alpha \times \beta \times [a_N \times MAT_N^3 + b_N \times MAT_N^2 + c_N \times MAT_N + d_N];$$

$$t_{final} = minimum[t_{final_D}, t_{final_N}] \quad [4]$$

The control value for $t_{final}$ may be used to control the fueling process throughout the fill. Because $MAT_D$ tends to be colder than $MAT_N$ at the beginning of a fill, the control value for $t_{final}$ may be initially dictated by $t_{final_D}$. However, $MAT_N$ tends to become progressively colder as a fill progresses, lowering $t_{final_N}$. When $t_{final_N}$ becomes less than $t_{final_D}$, the control value for $t_{final}$ smoothly and seamlessly switches from being dictated by $t_{final_D}$ to being dictated by $t_{final_N}$.

For each time interval, the control value for $t_{final}$ may be used to identify PRR at operation 440 and/or a target fill pressure (P) at operation 450. Using PRR to control the fueling rate and P to control the fill pressure throughout the fill ensures that the fuel tank does not overheat or overfill during fueling. A value for PRR may be calculated, for example, using Equation [5]:

$$PRR = \frac{(P_{final} - P_{current})}{\left[t_{final} \times \frac{(P_{final} - P_{initial})}{(P_{final} - P_{min})} - t_{current}\right]} \quad [5]$$

where $P_{current}$ is a current fill pressure of the hydrogen gas;

$P_{initial}$ is a fill pressure of the hydrogen gas during fueling startup; and $t_{current}$ is an elapsed fill time.

A value for a target fill pressure for the next time interval ($P_{(i+1)}$) may be calculated, for example, using Equation [6]:

$$P_{(i+1)} = P_i + \frac{(P_{final} - P_{(i)})}{\left[t_{final} \times \frac{(P_{final} - P_{initial})}{(P_{final} - P_{min})} - t_{(i)}\right]} \times [t_{(i+1)} - t_{(i)}] \quad [6]$$

where $P_{(i)}$ is a fill pressure of the hydrogen gas according to the current measurement;

$t_{(i)}$ is a fill time according to the current measurement; and $t_{(i+1)}$ is a fill time according to the next measurement.

When $t_{final}$ is dictated by $t_{final_D}$, values for $P_{final}$, $P_{current}$, $P_{(i)}$, $P_{initial}$, and/or $P_{min}$ may be detected by and/or received from the first pressure sensor 224. When $t_{final}$ is dictated by $t_{final_N}$, values for $P_{final}$, $P_{current}$, $P_{(i)}$, $P_{initial}$, and/or $P_{min}$ may be detected by and/or received from the second pressure sensor 234. In some examples, a single pressure sensor (e.g., first pressure sensor 224, second pressure sensor 234) detects and/or provides values for $P_{final}$, $P_{current}$, $P_{(i)}$, $P_{initial}$, and/or $P_{min}$, whether $t_{final}$ is dictated by $t_{final_D}$ or $t_{final_N}$.

In this manner, inherent margins that exist in the original MC Formula may be reduced by increasing a fueling rate and/or target fill pressure. Additionally or alternatively, the inherent margins may be reduced by reducing an energy used to pre-cool the hydrogen gas (e.g., by the heat exchanger 108) before it is delivered to the dispenser 104.

Figure 5:
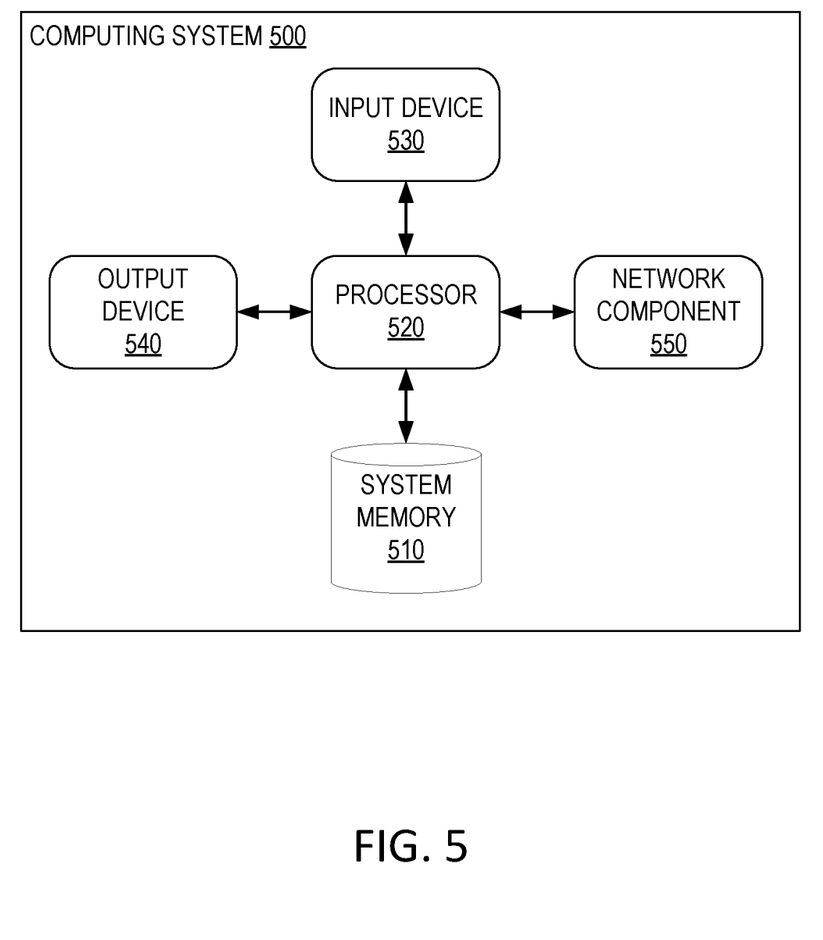
FIG. 5 is a block diagram of an example computing system that may be used to control a fueling procedure at a filling station, such as using the hydrogen station shown in FIG. 1, in accordance with one aspect of the present disclosure.

FIG. 5 shows an example computing system 500 configured to perform one or more computing operations. While some examples of the disclosure are illustrated and described herein with reference to the computing system 500 being included in a controller 210 (shown, e.g., in FIG. 1), aspects of the disclosure are operable with any computing system (e.g., connection sensor 118, sensors 120, first sensors 220, first temperature sensor 222, first pressure sensor 224, first mass flow meter 226, first ambient temperature sensor 228, second sensors 230, second temperature sensor 232, second pressure sensor 234, second mass flow meter 236, second ambient temperature sensor 238) that executes instructions to implement the operations and functionality associated with the computing system 500. The computing system 500 shows only one example of a computing environment for performing one or more computing operations and is not intended to suggest any limitation as to the scope of use or functionality of the disclosure.

In some examples, the computing system 500 includes a system memory 510 and a processor 520 coupled to the system memory 510. The system memory 510 stores data associated with the control system 200 and computer-executable instructions, and the processor 520 is programmed or configured to execute the computer-executable instructions for implementing aspects of the disclosure using the control system 200. The system memory 510 includes one or more computer-readable media that allow information, such as the computer-executable instructions and other data, to be stored and/or retrieved by the processor 520. For example, at least some data may be associated with one or more fuel tanks, vehicles, fuel types, fuel amounts, fuel temperatures, fuel pressures, flow rates, ambient temperatures, one or more control mechanisms (e.g., heat exchanger 108, breakaway 114, first hydrogen flow regulator 240, second hydrogen flow regulator 242), and/or one or more sensors (e.g., connection sensor 118, sensors 120, first sensors 220, first temperature sensor 222, first pressure sensor 224, first mass flow meter 226, first ambient temperature sensor 228, second sensors 230, second temperature sensor 232, second pressure sensor 234, second mass flow meter 236, second ambient temperature sensor 238) such that the computer-executable instructions enable the processor 520 to manage or control one or more operations of the controller 210.

By way of example, and not limitation, computer-readable media may include computer storage media and communication media. Computer storage media are tangible and mutually exclusive to communication media. For example, the system memory 510 may include computer storage media in the form of volatile and/or nonvolatile memory, such as read only memory (ROM) or random access memory (RAM), electrically erasable programmable read-only memory (EEPROM), solid-state storage (SSS), flash memory, a hard disk, a floppy disk, a compact disc (CD), a digital versatile disc (DVD), magnetic tape, or any other medium that may be used to store desired information that may be accessed by the processor 520. Computer storage media are implemented in hardware and exclude carrier waves and propagated signals. That is, computer storage media for purposes of this disclosure are not signals per se.

In some examples, the processor 520 executes the computer-executable instructions to identify a plurality of fuel temperatures, determine a plurality of candidate fill times, and select a control value for controlling a delivery of fuel to the fuel tank. The control value may be selected, for example, by comparing the candidate fill times and identifying the lowest candidate fill time. A state of the control system 200 may be monitored (e.g., using one or more sensors 120), and one or more control mechanisms (e.g., heat exchanger 108, breakaway 114, first hydrogen flow regulator 240, second hydrogen flow regulator 242) may be adjusted based on the monitoring. For example, a flow rate of the hydrogen gas may be adjusted and/or heat may be removed from the hydrogen gas based on the state of the control system 200. The processor 520 may include one or more processing units (e.g., in a multi-core configuration). Although the processor 520 is shown separate from the system memory 510, examples of the disclosure contemplate that the system memory 510 may be onboard the processor 520, such as in some embedded systems.

A user or operator may enter commands and other input into the computing system 500 through one or more input devices 530 (e.g., connection sensor 118, sensors 120, first sensors 220, first temperature sensor 222, first pressure sensor 224, first mass flow meter 226, first ambient temperature sensor 228, second sensors 230, second temperature sensor 232, second pressure sensor 234, second mass flow meter 236, second ambient temperature sensor 238) coupled to the processor 520. The input devices 530 are configured to receive information (e.g., from the user). Example input devices 530 include, without limitation, a pointing device (e.g., mouse, trackball, touch pad, joystick), a keyboard, a game pad, a controller, a microphone, a camera, a gyroscope, an accelerometer, a position detector, and an electronic digitizer (e.g., on a touchscreen). Information, such as text, images, video, audio, and the like, may be presented to a user via one or more output devices 540 coupled to the processor 520. The output devices 540 are configured to convey information (e.g., to the user). Example, output devices 540 include, without limitation, a monitor, a projector, a printer, a speaker, a vibrating component. In some examples, an output device 540 is integrated with an input device 530 (e.g., a capacitive touch-screen panel, a controller including a vibrating component).

One or more network components 550 may be used to operate the computing system 500 in a networked environment using one or more logical connections. Logical connections include, for example, local area networks and wide area networks (e.g., the Internet). The network components 550 allow the processor 520, for example, to convey information to and/or receive information from one or more remote devices, such as another computing system or one or more remote computer storage media. Network components 550 may include a network adapter, such as a wired or wireless network adapter or a wireless data transceiver.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

Example filling stations and control systems for filling stations are described herein and illustrated in the accompanying drawings. This written description uses examples to disclose aspects of the disclosure and also to enable a person skilled in the art to practice the aspects, including making or using the above-described systems and executing or performing the above-described methods. The actual amount of heat transferred from the fueling hardware to the hydrogen gas throughout the fill is inherently less than the amount of heat assumed to be transferred in the original MC Formula. Examples described herein provide shorter fill times and/or reduced energy usage by taking advantage of down-the-line readings that more-accurately reflect this heat transfer without using in-tank sensors.

Having described aspects of the disclosure in terms of various examples with their associated operations, it will be apparent that modifications and variations are possible without departing from the scope of the disclosure as defined in the appended claims. That is, aspects of the disclosure are not limited to the specific examples described herein, and all matter contained in the above description and shown in the accompanying drawings shall be interpreted as illustrative and not in a limiting sense. For example, the examples described herein may be implemented and utilized in connection with many other applications such as, but not limited to, other filling stations.

Components of the systems and/or operations of the methods described herein may be utilized independently and separately from other components and/or operations described herein. Moreover, the methods described herein may include additional or fewer operations than those disclosed, and the order of execution or performance of the operations described herein is not essential unless otherwise specified. That is, the operations may be executed or performed in any order, unless otherwise specified, and it is contemplated that executing or performing a particular operation before, contemporaneously with, or after another operation is within the scope of the disclosure. Although specific features of various examples of the disclosure may be shown in some drawings and not in others, this is for convenience only. In accordance with the principles of the disclosure, any feature of a drawing may be referenced and/or claimed in combination with any feature of any other drawing.

When introducing elements of the disclosure or the examples thereof, the articles "a," "an," "the," and "said" are intended to mean that there are one or more of the elements. References to an "embodiment" or an "example" of the present disclosure are not intended to be interpreted as excluding the existence of additional embodiments or examples that also incorporate the recited features. The terms "comprising," "including," and "having" are intended to be inclusive and mean that there may be elements other than the listed elements. The phrase "one or more of the following: A, B, and C" means "at least one of A and/or at least one of B and/or at least one of C."

The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A computer-implemented method of filling a fuel tank, the method comprising:
    monitoring a plurality of fuel temperatures using a first sensor at a first location at a filling station and a second sensor at a second location at the filling station, the plurality of fuel temperatures including a first fuel temperature corresponding to the first location at the filling station and a second fuel temperature corresponding to a second location at the filling station;
    iteratively determining a plurality of candidate fill times based on the plurality of fuel temperatures, the plurality of candidate fill times including a first candidate fill time determined using the first fuel temperature and a second candidate fill time determined using the second fuel temperature;
    comparing the plurality of candidate fill times at a first time to select a first control value for controlling a delivery of fuel to the fuel tank, the first control value associated with the first candidate fill time;
    delivering the fuel to the fuel tank using a dispenser in accordance with the first control value;
    comparing the plurality of candidate fill times at a second time to select a second control value for controlling the delivery of fuel to the fuel tank, the second control value associated with the second candidate fill time; and
    delivering the fuel to the fuel tank using the dispenser in accordance with the second control value.

2. The method of claim 1 further comprising associating a dispenser with the first location.

3. The method of claim 1 further comprising associating a nozzle with the second location.

4. The method of claim 1, wherein the plurality of fuel temperatures are detected at a plurality of times including the first time and the second time.

5. The method of claim 1, wherein the plurality of candidate fill times are determined at a plurality of times including the first time and the second time.

6. The method of claim 1, wherein the first control value is selected at the first time, and the second control value is selected at the second time.

7. The method of claim 1 further comprising determining when to change from delivering the fuel in accordance with the first control value to delivering the fuel in accordance with the second control value.

8. The method of claim 1 further comprising determining whether to remove heat from the fuel based on the second fuel temperature.

9. A control system for controlling a filling station, the controller comprising:
- a plurality of sensors detecting a plurality of fuel temperatures at the filling station, the plurality of fuel temperatures including a first fuel temperature corresponding to a first location at the filling station and a second fuel temperature corresponding to a second location at the filling station; and
- a controller communicating with the plurality of sensors to monitor the plurality of fuel temperatures, using the plurality of fuel temperatures to iteratively determine a plurality of candidate fill times, comparing the plurality of candidate fill times at a first time to identify a first control value associated with a first candidate fill time for controlling a delivery of fuel, and comparing the plurality of candidate fill times at a second time to identify a second control value associated with a second candidate fill time for controlling the delivery of the fuel, the first candidate fill time corresponding to the first fuel temperature and the second candidate fill time corresponding to the second fuel temperature.

10. The control system of claim 9, wherein the controller is configured to communicate with the plurality of sensors to identify the plurality of fuel temperatures at a plurality of times including the first time and the second time.

11. The control system of claim 9, wherein the controller is configured to use the plurality of fuel temperatures to determine the plurality of candidate fill times at a plurality of times including the first time and the second time.

12. The control system of claim 9, wherein the controller is configured to identify the first control value at the first time and identify the second control value at the second time.

13. The control system of claim 9, wherein the controller is configured to determine when to change delivering the fuel in accordance with the first control value to delivering the fuel in accordance with the second control value.

14. The control system of claim 9, further comprising a heat exchanger, wherein the controller is configured to determine whether to remove heat from the fuel based on the second fuel temperature.

* * * * *